United States Patent [19]

Mimbs

[11] Patent Number: 4,808,253

[45] Date of Patent: Feb. 28, 1989

[54] METHOD AND APPARATUS FOR PERFORMING A REPAIR ON A CONTOURED SECTION OF A COMPOSITE STRUCTURE

[75] Inventor: Charles C. Mimbs, Gordon, Ga.

[73] Assignee: Grumman Aerospace Corporation, Bethpage, N.Y.

[21] Appl. No.: 118,184

[22] Filed: Nov. 6, 1987

[51] Int. Cl.$^4$ .............................................. B32B 35/00
[52] U.S. Cl. .................................. 156/98; 29/402.11; 156/289; 156/583.3; 428/63
[58] Field of Search ................ 156/94, 98, 583.3, 289; 428/63; 29/402.11

[56] References Cited

U.S. PATENT DOCUMENTS

| | | | |
|---|---|---|---|
| 4,408,558 | 10/1983 | Faber et al. | 156/583.3 X |
| 4,511,425 | 4/1985 | Boyd et al. | 156/583.3 X |
| 4,517,038 | 5/1985 | Miller | 156/98 |
| 4,554,036 | 11/1985 | Newsom | 156/94 |
| 4,636,275 | 1/1987 | Norell | 156/289 |
| 4,652,319 | 3/1987 | Hammond | 156/94 |
| 4,668,317 | 5/1987 | Snyder | 156/98 |
| 4,737,208 | 4/1988 | Bloechle et al. | 156/289 X |

Primary Examiner—Robert A. Dawson
Attorney, Agent, or Firm—Richard G. Geib; Daniel J. Tick; Bernard S. Hoffman

[57] ABSTRACT

A method for performing a repair to a damaged area on a contoured section of a composite structure, including the steps of laying up a repair patch over the damaged area of the composite structure, installing a conformal thermocouple over the repair patch so that the conformal thermocouple is in direct communication with and completely conforms to the exact shape of the contour section so as to act as a vehicle for the transfer of heat and pressure to the repair patch, applying heat to the repair patch via the conformal thermocouple, applying pressure to the repair patch via the conformal thermocouple, and curing the repair patch.

23 Claims, 1 Drawing Sheet

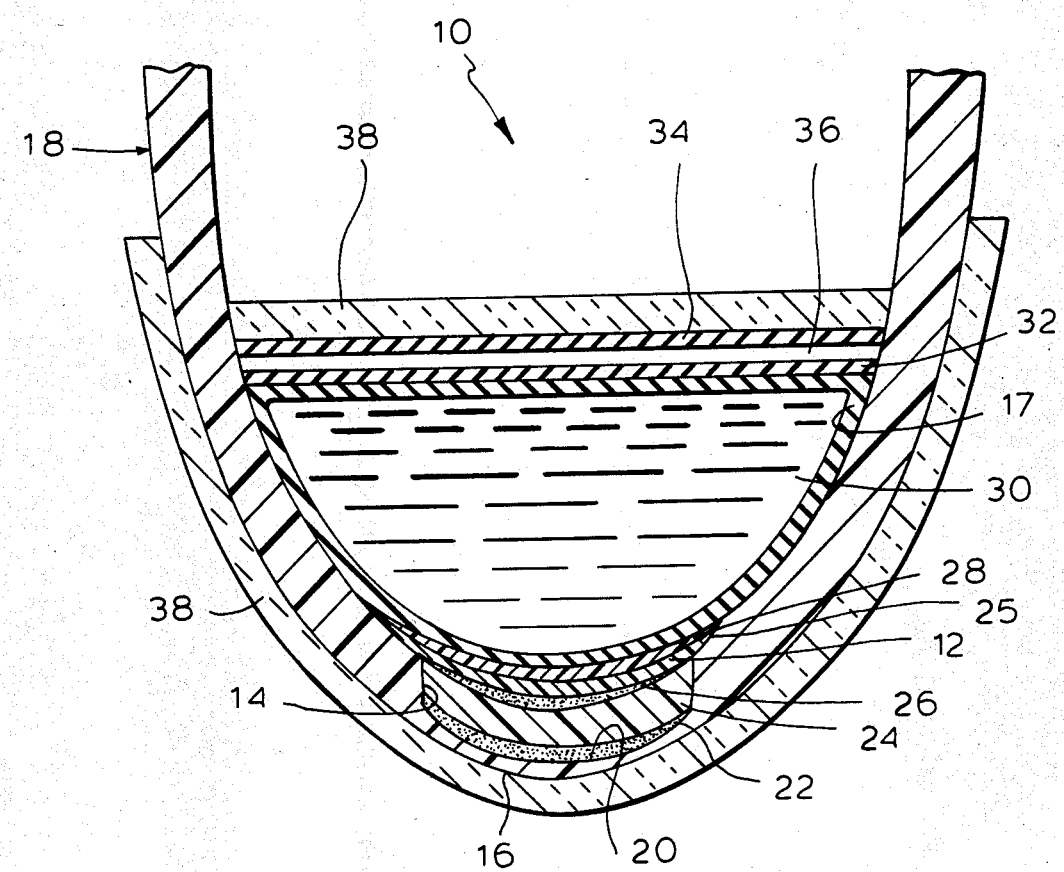

METHOD AND APPARATUS FOR PERFORMING A REPAIR ON A CONTOURED SECTION OF A COMPOSITE STRUCTURE

BACKGROUND OF THE INVENTION

The present invention relates to a method and apparatus for performing a repair on a contoured section of a composite structure. More particularly, the present invention relates to a method and apparatus for performing a repair on a contoured section of a composite structure, which uses a conformal thermocouple for the transfer of heat and pressure.

When curing a repair patch on a contoured surface of a composite structure, a conventional heating blanket alone cannot completely conform to the exact shape of the contoured surface of the composite structure and bridges over sections of the contoured surface of the composite structure. This bridging prevents complete intimate contact between the heating blanket and the repair patch to be cured. Consequently, an insufficient thermal coupling exists between the heating blanket and the repair patch to be cured. Furthermore, little or no pressure, from the local vacuum bag, is transmitted to the repair patch to be cured. Thus, a good repair would not be accomplished.

SUMMARY OF THE INVENTION

Accordingly, it is an object of the present invention to provide a method and apparatus for performing a repair on a contoured section of a composite structure which avoids the disadvantages of the prior art.

More particularly, it is an object of the present invention to provide a method and apparatus for performing a repair on a contoured section of a composite structure, which allows complete intimate contact, sufficient thermal coupling, and sufficient pressure to exist between a conventional heating blanket and the repair patch to be cured so that a good repair would be accomplished.

In keeping with these objects, and with others which will become apparent hereinafter, one feature of the present invention resides, briefly stated, in a method for performing a repair to a damaged area on a contoured section of a composite structure, which includes the steps of laying up a repair patch over the damaged area of the composite structure, applying heat to the repair patch via a conformal thermocouple, applying pressure to the repair patch via the conformal thermocouple, and curing the first patch wherein a conformal thermocouple is installed over the repair patch.

When the method and apparatus for performing a repair on a contoured section of a composite structure is designed in accordance with the present invention, the conformal thermocouple is in direct communication with and completely conforms to the exact shape of the contoured section of the composite structure so as to act as a vehicle for the transfer of heat and pressure to the repair patch.

In accordance with another feature of the present invention, the method for performing a repair further includes the steps of supporting the contoured section of the composite structure to be repaired prior to said step of laying up a repair patch over the damaged area of the composite structure, removing the damaged area from the contoured section of the composite structure to be repaired prior to said step of laying up a repair patch over the damaged area of the composite structure, placing a release patch over the repair patch subsequent to said step of laying up a repair patch over the damaged area of the composite structure, and applying insulation to the contoured section of the composite structure so as to reduce heat loss subsequent to said step of applying a vacuum to the repair patch via the conformal thermocouple.

Another feature of the present invention is that it further comprises the steps of removing the insulation from the contoured section of the composite structure, removing the pressure from the repair patch, removing the heat from the repair patch, removing the conformal thermocouple from the release patch, and removing the release patch from the repair patch.

Yet another feature of the present invention is a method for performing a repair to a damaged area on a contoured section of a composite structure, which includes the steps of supporting the contoured section of the composite structure to be repaired, removing the damaged area from the contoured section of the composite structure and leaving a repair site, laying up a first patch over the repair site, placing a second patch over the first patch, installing a conformal thermocouple over the second patch so that the conformal thermocouple is in direct communication with and completely conforms to the exact shape of the repair stte so as to act as a vehicle for the transfer of heat and pressure to the repair site, applying heat to the repair site via the conformal thermocouple, applying pressure to the repair site via the conformal thermocouple, applying insulation to the repair site so as to reduce heat loss, and curing the first patch.

Still another feature of the present invention is that it further includes the steps of removing the insulation from the area surrounding the repair site, removing the pressure from the repair site, removing the heat from the repair site, removing the conformal thermocouple from the second patch, and removing the second patch from the first patch.

Yet still another feature of the present invention is that the step of laying up a first patch over the repair site includes laying up a repair patch over the repair site.

Still yet another feature of the present invention is that the step of placing a second patch over the first patch includes placing a release film over the first patch.

Another feature of the present invention is that the step of placing a release film over the first patch includes placing a FEP film over the first patch.

Yet another feature of the present invention is that the step of installing a conformal thermocouple over the second patch includes installing a pliable bag filled with a thermal conductive fluid over the second patch.

Still another feature of the present invention is that the step of installing a pliable bag filled with a thermal conductive fluid over the second patch includes installing a pliable bag filled with grease over the second patch.

Yet still another feature of the present invention is that the step of installing a pliable bag filled with grease over the second patch includes installing a pliable bag filled with silicon fluid over the second patch.

Still yet another feature of the present invention is that the step of applying heat to the conformal thermocouple includes using at least one conventional heating blanket to apply heat to the repair site via the conformal thermocouple.

Another feature of the present invention is that the step of applying a pressure to the conformal thermocouple includes using a vacuum bag to apply pressure to the repair site via the conformal thermocouple.

Yet another feature of the present invention is a method for performing a repair to an area consisting of a damaged core and a damaged skin on a contoured section of a composite structure, which includes the steps of supporting the contoured section of the composite structure to be repaired, removing the damaged core and the damaged skin from the contoured section of the composite structure and leaving a repair site with a skin-to-core faying surface, applying an adhesive to the skin-to-core faying surface, installing a core to the adhesive on the skin-to-core faying surface to replace the removed damaged core, laying up an adhesive and a repair patch to the replacement core and surrounding area of the repair site, placing a release film over the repair patch, installing a conformal thermocouple over the release film so that the conformal thermocouple is in direct communication with and completely conforms to the exact shape of the repair site so as to act as a vehicle for the transfer of heat and pressure to the repair site, positioning at least one conventional heating blanket over the conformal thermocouple for producing heat in the conformal thermocouple, applying a local vacuum bag over the repair site for producing pressure in the conformal thermocouple, insulating the area surrounding the repair site so as to reduce heat loss from the repair site, activating the at least one conventional heating blanket so that heat is applied to the entire repair site via the conformal thermocouple, activating the vacuum bag so that pressure is applied to the entire repair site via the conformal thermocouple, and curing the repair patch.

Still another feature of the present invention is that it further includes the steps of removing the insulation from the area surrounding the repair site, removing the vacuum bag from the conformal thermocouple, removing the at least one conventional heating blanket from the conformal thermocouple, removing the conformal thermocouple from the repair site, and removing the release film from the repair patch.

Yet still another feature of the present invention is that the step of placing a release film over the repair patch includes placing a FEP film over the repair patch.

Still yet another feature of the present invention is that the step of installing a conformal thermocouple over the release film includes installing a pliable bag filled with a thermal conductive fluid over the release film.

Another feature of the present invention is that the step of installing a pliable bag filled with a thermal conductive fluid over the release film includes installing a pliable bag filled with grease over the release film.

Yet another feature of the present invention is that the step of installing a pliable bag filled with grease over the release film includes installing a pliable bag filled with silicon fluid over the release film.

Still another feature of the present invention is an apparatus for performing a repair to a damaged area on a contoured section of a composite structure includes a pliable bag, and fluid means for filling the pliable bag so that the pliable bag is in direct communication with and completely conforms to the exact shape of the contoured section of the composite structure in the damaged area so as to act as a vehicle for the transfer of heat and pressure to the entire repair site.

Yet still another feature of the present invention is that the fluid means include a thermal conductive fluid.

Still yet another feature of the present invention is that the thermal conductive fluid is grease.

Another feature of the present invention is that the grease is silicon.

Yet another feature of the present invention is an arrangement for performing a repair to a damaged area on a contoured section of a composite structure wherein the damaged area is removed from the contoured section of the composite structure so as to leave a repair site including, a repair patch laid up over the repair site, a release film placed over the repair patch, a conformal thermocouple installed over the release film so that the conformal thermocouple is in direct communication with and completely conforms to the exact shape of the repair site so as to act as a vehicle for the transfer of heat and pressure to the entire repair site, an insulator applied to the area surrounding the repair site so as to reduce heat loss, at least one conventional heating blanket applied over the conformal thermocouple for applying heat to the entire repair site via the conformal thermocouple, and a local vacuum bag applied over the at least one conventional heating blanket for applying pressure to the entire repair site via the conformal thermocouple.

Still another feature of the present invention is that the release film is a FEP film.

Yet still another feature of the present invention is that the conformal thermocouple is a pliable bag filled with a thermal conductive fluid.

Still yet another feature of the present invention is that the pliable bag filled with a thermal conductive fluid is a pliable bag filled with grease.

Finally, still a further feature of the present invention is that the pliable bag filled with grease is a pliable bag filled with silicon fluid.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The sole FIGURE is a cross sectional view of a composite structure utilizing the method and apparatus for performing a repair on a contoured section of a composite structure of the present invention.

DETAILED DESCRIPTION OF THE PREFERRED EMBODIMENT

Referring now to the sole FIGURE, the method and apparatus for performing a repair on a contoured section of a composite structure is shown generally at 10 curing a repair patch 12 on a damaged area 14 of a contoured section 16 of a composite structure 18.

The damaged area 14 must first be cleaned out. This involves removing the damaged core and the damaged skin (not shown) from the contoured section 16 of the composite structure 18 and leaving a repair site 17 with a skin-to-core faying surface 20.

A layer of adhesive 22 is applied to the skin-tocore faying surface 20 and a replacement core 24 is installed on the adhesive 22 on the skin-to-core faying surface 20 to replace the removed damaged core.

Another layer of adhesive 26 is applied on the replacement core 24 and the surrounding area 25. The repair patch 12 is then laid up on the adhesive 26.

A release film 28 is placed over the repair patch 12. The release film 28 is preferably FEP film but is not limited to it.

A conformal thermocouple 30 is installed over the release film 28 so that the conformal thermocouple 30 is in direct communication with and completely conforms to the exact shape of the repair site 17 of the contoured section 16 of the composite structure 18 and acts as a vehicle for the transfer of heat and pressure to the repair site 17. The conformal thermocouple 30 is preferably a sealed envelope of high temperature bagging material filled with thermal conductive fluid. For example, Dow No. 4 silicon grease but is not limited to it.

At least one conventional heating blanket 32 is positioned over the conformal thermocouple 30 so that heat is applied to the entire repair site 17 via the conformal thermocouple 30. A local vacuum bag 34 is applied over the entire repair site 17 so that pressure is applied to the entire repair site 17 via the conformal thermocouple 30. A breather patch 36 is placed intermediate the conformal thermocouple 30 and the local vacuum bag 34. The breather patch 36 more evenly distributes the pressure created by the local vacuum bag 34.

The area surrounding the repair site 17 is covered with insulation 38 to reduce heat loss from the repair site 17 during curing of the repair patch 12. The insulation 38 is placed over the local vacuum bag 34 and the surrounding area and also over the surface of the contoured section 16 opposite the surface being repaired, as shown in the drawing.

Since the conformal thermocouple 30 is disposed intermediate the repair patch 12 and the local vacuum bag 34 during curing, the fluid in the conformal thermocouple 30 is pressurized by the local vacuum bag 34 and causes the conformal thermocouple 30 to change shape and fill the gaps between the bridging conventional heating blanket 32 and the repair patch 12. This allows sufficient thermal coupling and pressure to be transmitted to the repair site 17 to provide a good repair.

Once the repair patch 12 has adequately cured or some time thereafter, depending on the decision of the operator, the insulation 38, the local vacuum bag 34, the breather 36, the at least one heating blanket 32, the conformal thermocouple 30, and the release film 28 are all removed, leaving a good repair.

It will be understood that each of the elements described above, or two or more together, may also find a useful application in other types of methods and constructions differing from the types described above.

While the invention has been illustrated and described as embodied in the method and apparatus for performing a repair on a contoured section of a composite structure, it is not intended to be limited to the details above, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

I claim:

1. A method for performing a repair to a damaged area on a contoured section of a composite structure, comprising the steps of:
   (a) supporting the contoured section of the composite structure to be repaired;
   (b) removing the damaged area from the contoured section of the composite structure to be repaired;
   (c) laying up a repair patch over the damaged area of the composite structure;
   (d) placing a release patch over the repair patch;
   (e) installing a conformal thermocouple over the repair patch so that conformal thermocouple is in direct communication with and completely conforms to the exact shape of the contoured section so as to act as a vehicle for the transfer of heat and pressure to the repair patch;
   (f) applying heat to the repair patch via the conformal thermocouple;
   (g) applying a pressure to the repair patch via the conformal thermocouple;
   (h) applying insulation to the contoured section of the composite structure so as to reduce heat loss; and
   (i) curing the repair patch.

2. A method for performing a repair as defined in claim 1; further comprising the steps of:
   (a) removing the insulation from the contoured section of the composite structure;
   (b) removing the pressure from the repair patch:
   (c) removing the heat from the repair patch;
   (d) removing the conformal thermocouple from the release patch; and
   (e) removing the release patch from the repair patch.

3. A method for performing a repair to a damaged area on a contoured section of a composite structure, comprising the steps of:
   (a) supporting the contoured section of the composite structure to be repaired;
   (b) removing the damaged area from the contoured section of the composite structure and leaving a repair site:
   (c) laying up a first patch over the repair site;
   (d) placing a second patch over the first patch:
   (e) installing a conformal thermocouple over the second patch so that the conformal thermocouple is in direct communication with and completely conforms to the exact shape of the repair site so as to act as a vehicle for the transfer of heat and pressure to the repair site;
   (f) applying heat to the repair site via the conformal thermocouple;
   (g) applying pressure to the repair site via the conformal thermocouple; and
   (h) applying insulation to the repair site so as to reduce heat loss:
   (i) curing the first patch.

4. A method for performing a repair as defined in claim 3; further comprising the steps of:
   (a) removing the insulation from the area surrounding the repair site;
   (b) removing the pressure from the repair site;
   (c) removing the heat from the repair site;
   (d) removing the conformal thermocouple from the second patch; and
   (e) removing the second patch from the first patch.

5. A method for performing a repair as defined in claim 3, wherein said step of laying up a first patch over the repair site includes laying up a repair patch over the repair site.

6. A method for performing a repair as defined in claim 3, wherein said step of placing a second patch over the first patch includes placing a release film over the first patch.

7. A method for performing a repair as defined in claim 6, wherein said step of placing a release film over the first patch includes placing a FEP film over the first patch.

8. A method for performing a repair as defined in claim 3, wherein said step of installing a conformal thermocouple over the second patch includes installing a pliable bag filled with a thermal conductive fluid over the second patch.

9. A method for performing a repair as defined in claim 8, wherein said step of installing a pliable bag filled with a thermal conductive fluid over the second patch includes installing a pliable bag filled with grease over the second patch.

10. A method for performing a repair as defined in claim 9, wherein said step of installing a pliable bag filled with grease over the second patch includes installing a pliable bag filled with silicon fluid over the second patch.

11. A method for performing a repair as defined in claim 3, wherein said step of applying heat to the conformal thermocouple includes using at least one conventional heating blanket to apply heat to the repair site via the conformal thermocouple.

12. A method for performing a repair as defined in claim 3, wherein said step of applying pressure to the conformal thermocouple includes using a vacuum bag to apply pressure to the repair site via the conformal thermocouple.

13. A method for performing a repair to an area consisting of a damaged core and a damaged skin on a contoured section of a composite structure, comprising the steps of:
 (a) supporting the contoured section of the composite structure to be repaired;
 (b) removing the damaged core and the damaged skin from the contoured section of the composite structure and leaving a repair site with a skin-to-core faying surface;
 (c) applying an adhesive to the skin-to-core faying surface;
 (d) installing a core to the skin-to-core faying surface to replace the removed damaged core:
 (e) laying up adhesive and a repair patch to the replacement core and surrounding area of the repair site;
 (f) placing a release film over the repair patch;
 (g) installing a conformal thermocouple over the release film so that the conformal thermocouple is in direct communication with and completely conforms to the exact shape of the repair site so as to act as a vehicle for the transfer of heat and pressure over the repair site;
 (h) positioning at least one conventional heating blanket over the conformal thermocouple for producing heat in the conformal thermocouple;
 (i) applying a local vacuum bag over the repair site for producing pressure in the conformal thermocouple;
 (j) insulating the area surrounding the repair site so as to reduce heat loss from the repair site;
 (k) activating the at least one conventional heating blanket so that heat is applied to the complete repair site via the conformal thermocouple;
 (l) activating the vacuum bag so that pressure is applied to the complete repair site via the conformal thermocouple; and
 (m) curing the repair patch.

14. A method for performing a repair to an area as defined in claim 13; further comprising the steps of:
 (a) removing the insulation from the area surrounding the repair site;
 (b) removing the vacuum bag from the conformal thermocouple;
 (c) removing the at least one conventional heating blanket from the conformal thermocouple;
 (d) removing the conformal thermocouple from the repair site; and
 (e) removing the release film from the repair patch.

15. A method for performing a repair to an area as defined in claim 13, wherein said step of placing a release film over the repair patch includes placing a FEP film over the repair patch.

16. A method for performing a repair to an area as defined in claim 13, wherein said step of installing a conformal thermocouple over the release film includes installing a pliable bag filled with a thermal conductive fluid over the release film.

17. A method for performing a repair to an area as defined in claim 16, wherein said step of installing a pliable bag filled with a thermal conductive fluid over the release film includes installing a pliable bag filled with grease over the release film.

18. A method for performing a repair to an area as defined in claim 17, wherein said step of installing a pliable bag filled with grease over the release film includes installing a pliable bag filled with silicon fluid over the release film.

19. An arrangement for performing a repair to a damaged area on a contoured section of a composite structure wherein the damaged area is removed from the contoured section of the composite structure so as to leave a repair site, comprising:
 (a) a repair patch laid up over the repair site;
 (b) a release film placed over said repair patch;
 (c) a conformal thermocouple installed over said release film so that said conformal thermocouple is in direct communication with and completely conforms to the exact shape of the repair site so as to act as a vehicle for the transfer of heat and pressure to the complete repair site;
 (d) an insulator applied to the area surrounding the repair site so as to reduce heat loss;
 (e) at least one conventional heating blanket applied over said conformal thermocouple for applying heat to the entire repair site via the conformal thermocouple; and
 (f) a vacuum bag applied over said at least one conventional heating blanket for applying pressure to the entire repair site via the conformal thermocouple.

20. An arrangement for performing a repair as defined in claim 19, wherein said release film is a FEP film.

21. An arrangement for performing a repair as defined in claim 19, wherein said conformal thermocouple is a pliable bag filled with a thermal conductive fluid.

22. An arrangement for performing a repair as defined in claim 21, wherein said pliable bag filled with a thermal conductive fluid is a pliable bag filled with grease.

23. An arrangement for performing a repair as defined in claim 22, wherein said pliable bag filled with grease is a pliable bag filled with silicon fluid.

* * * * *